United States Patent
Yamaoka

(10) Patent No.: US 11,524,722 B2
(45) Date of Patent: Dec. 13, 2022

(54) VEHICLE STORAGE STRUCTURE

(71) Applicant: HONDA MOTOR CO., LTD., Tokyo (JP)

(72) Inventor: Yuichiro Yamaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 17/198,605

(22) Filed: Mar. 11, 2021

(65) Prior Publication Data

US 2021/0284242 A1 Sep. 16, 2021

(30) Foreign Application Priority Data

Mar. 16, 2020 (JP) .............................. JP2020-044919

(51) Int. Cl.
*B60J 7/00* (2006.01)
*B62D 21/15* (2006.01)

(52) U.S. Cl.
CPC .................................. *B62D 21/152* (2013.01)

(58) Field of Classification Search
CPC .. Y02E 60/10; A61K 2300/00; A61K 9/2054; H04L 5/0007; A61P 29/00; A61P 43/00; A61P 35/00; C21C 5/35; B31B 2155/00
See application file for complete search history.

(56) References Cited

U.S. PATENT DOCUMENTS

| | | | |
|---|---|---|---|
| 2007/0022670 A1* | 2/2007 | Herter | E04H 6/005 52/79.1 |
| 2021/0284072 A1* | 9/2021 | Minoyama | B60R 7/04 |
| 2021/0284074 A1* | 9/2021 | Minoyama | B60R 7/04 |
| 2021/0284242 A1* | 9/2021 | Yamaoka | B60R 13/013 |

FOREIGN PATENT DOCUMENTS

JP 2005-029103 A 2/2005

* cited by examiner

*Primary Examiner* — Kiran B Patel
(74) *Attorney, Agent, or Firm* — Rankin, Hill & Clark LLP

(57) ABSTRACT

A vehicle storage structure is deformed and crushed, when an excessive load is inputted to a vehicle from outside, without any influence to functions of surrounding structures. The vehicle storage structure includes a case formed in a box shape having side walls, rising integrally with a periphery of a bottom plate, and an open top face, wherein when a line in a vehicle front-rear direction, connecting centers in an up-down direction of the bottom plate, is defined as a bottom-plate center line, and a line connecting a front end of the bottom-plate center line with a rear end of the bottom-plate center line is defined as a bottom-end connection line, the bottom-plate center line is a polygonal line having a ridge as a folding point and the ridge is positioned higher than the bottom-end connection line.

8 Claims, 13 Drawing Sheets

FIG. 1
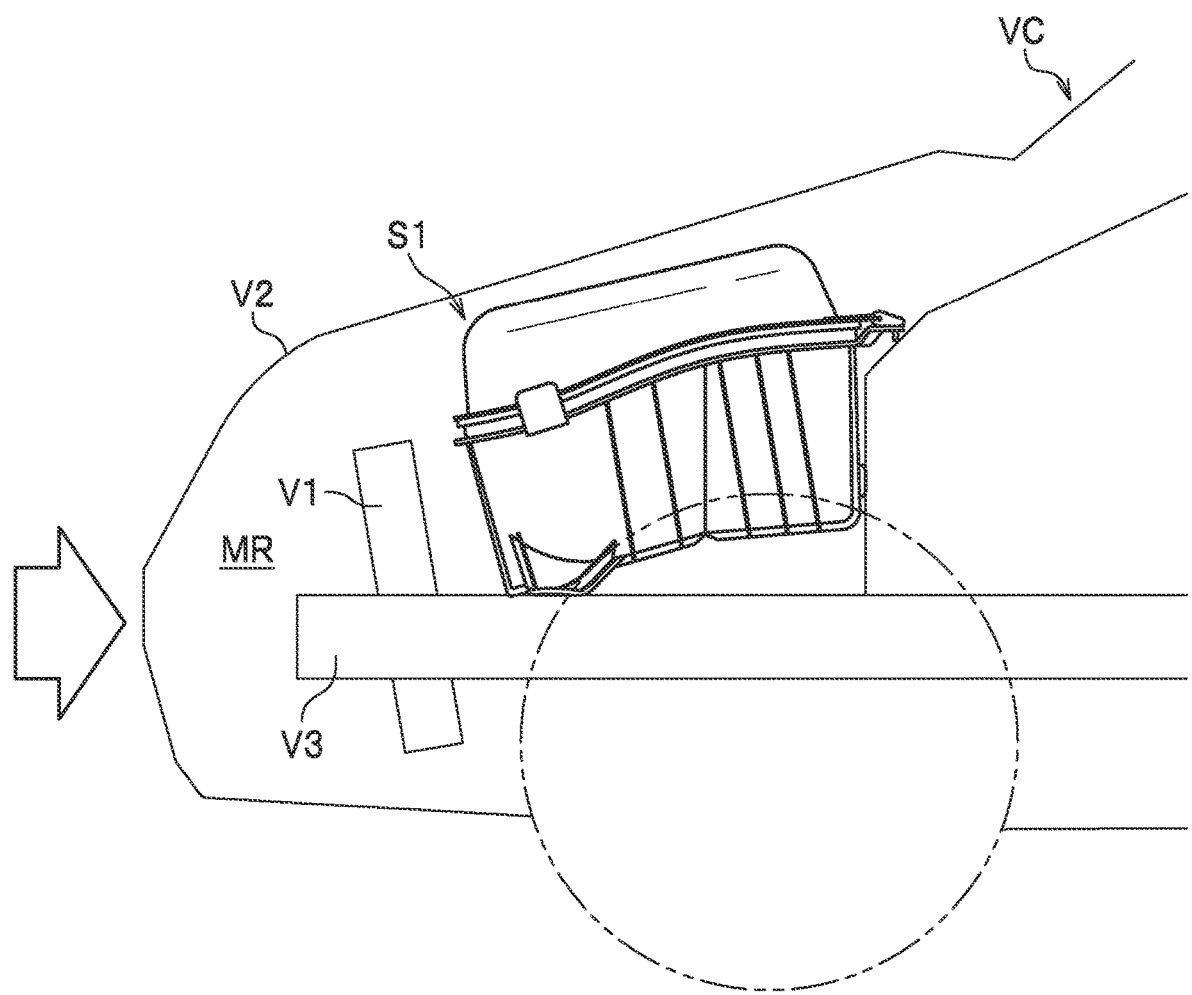
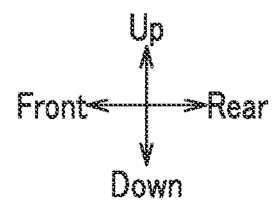

VEHICLE STORAGE STRUCTURE

CROSS-REFERENCE TO RELATED APPLICATION

This application claims the benefit of priority to Japanese Patent Application No. 2020-044919 filed on Mar. 16, 2020, the disclosures of all of which are hereby incorporated by reference in their entireties.

TECHNICAL FIELD

The present invention relates to a vehicle storage structure provided inside or outside a vehicle interior.

BACKGROUND OF THE INVENTION

There has been a technique of providing a storage structure as a storage space inside a vehicle but outside a vehicle interior. For example, Japanese Patent Application Publication No. 2005-029103 discloses a trunk box provided, as a storage space, in an engine room at a front of a vehicle, to effectively utilize a limited in-vehicle space.

SUMMARY OF THE INVENTION

Problems to be Solved

A storage structure provided outside a vehicle interior is located at an uppermost position in the engine room, in consideration of putting in and out stored items. Various kinds of auxiliary equipment, energy absorbing structure, and the like are arranged under the storage structure. The energy absorbing structure is deformed and crushed, when an excessive load is inputted from outside, to absorb collision energy to protect an occupant or occupants in the vehicle interior. Accordingly, when an excessive load is inputted from outside, the storage structure provided outside the vehicle interior needs to be moved, deformed, and crushed, without any influence to functions of the equipment arranged in the engine room and the energy absorbing structure.

The present invention has been made in view of the above-identified problems and is intended to provide a vehicle storage structure to be deformed and crushed, when an excessive load is inputted to a vehicle from outside, without any influence to functions of surrounding structures.

Solution to Problem

A vehicle storage structure of the present invention, as a solution to the above-identified problem, includes a case formed in a box shape having side walls, rising integrally with a periphery of a bottom plate, and an open top face, wherein when a line in a vehicle front-rear direction, connecting centers in an up-down direction of the bottom plate, is defined as a bottom-plate center line and a line connecting a front end of the bottom-plate center line with a rear end of the bottom-plate center line is defined as a bottom-end connection line, the bottom-plate center line is a polygonal line having a ridge as a folding point and the ridge is positioned higher than the bottom-end connection line.

Advantageous Effects of the Invention

The present invention provides a vehicle storage structure to be deformed and crushed without any influence to functions of surrounding structures, when an excessive load is inputted to a vehicle from outside.

BRIEF DESCRIPTION OF DRAWINGS

FIG. 1 is a schematic side view of a vehicle storage structure according to a first embodiment of the present invention mounted on a vehicle;

EMBODIMENTS OF THE INVENTION

First Embodiment

Figure 2:
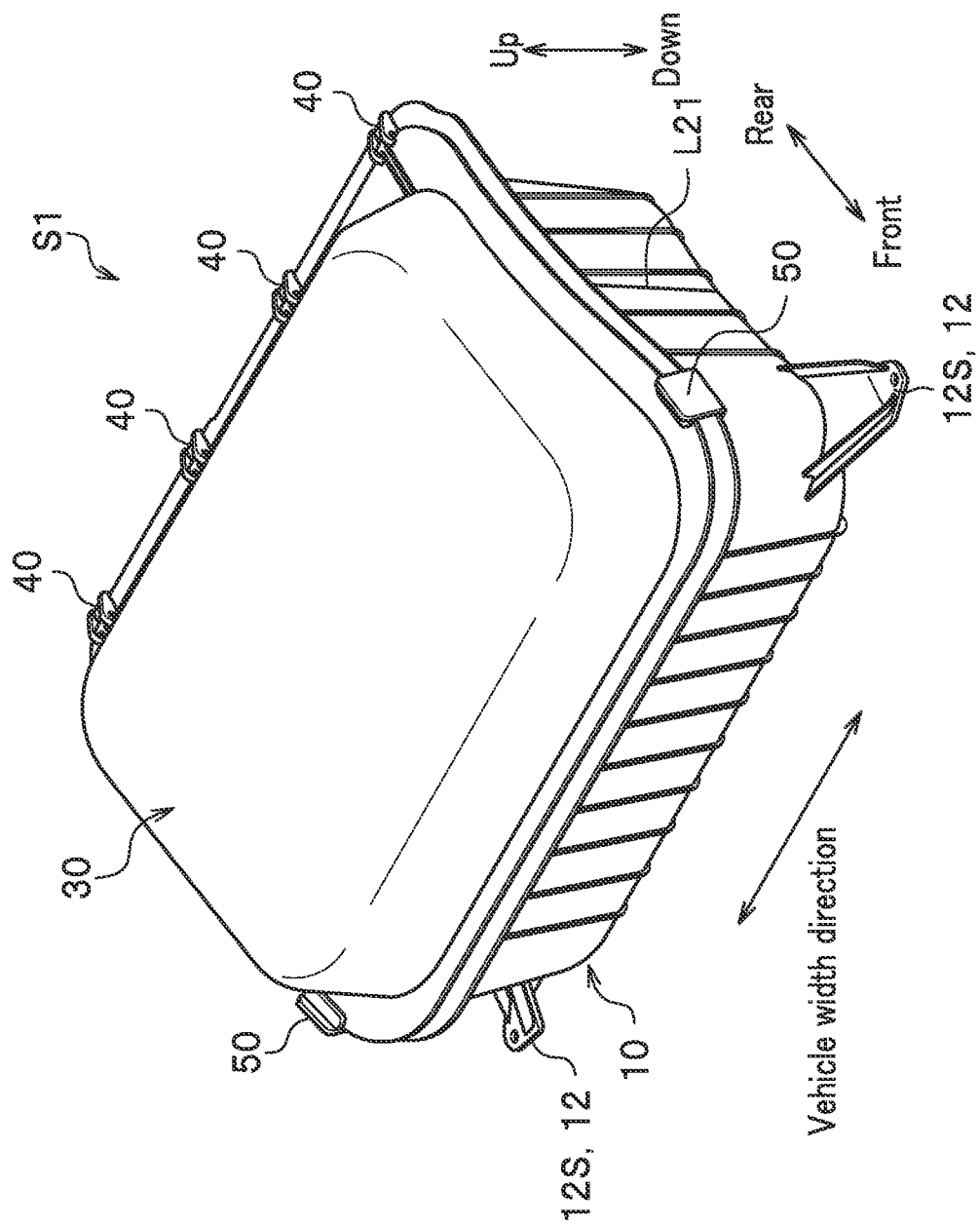
FIG. 2 is a perspective view of the vehicle storage structure according to the first embodiment, as viewed from above.

Next, a first embodiment of the present invention is described in detail with reference to drawings. Note that the same components are denoted by the same reference numerals, and duplicate descriptions thereof are omitted. As shown in FIGS. 1 to 8, a vehicle storage structure S1 of the present embodiment is arranged in a motor room MR in front of a vehicle interior of a vehicle VC. The motor room MR is provided with equipment as driving sources of a vehicle (such as an engine and a motor), a shock absorbing structure (not shown), and the like, in addition to the vehicle storage structure S1.

In an electric vehicle, for example, a motor (not shown) as a driving source may usually require less space than an engine (not shown). Then, it has been popular to arrange a structure corresponding to the vehicle storage structure S1 in a saved space to utilize as a storage space. The vehicle storage structure S1 is located at an uppermost position in the motor room MR, in consideration of putting in and out stored items (see FIG. 1). In other words, a shock absorbing structure (not shown) is located under the vehicle storage structure S1.

Note that the shock absorbing structure is a structure to absorb shock, when an excessive load is inputted from outside due to the vehicle VC having had a collision or the like, to protect occupants. In the present embodiment, the vehicle storage structure S1 is provided in the motor room MR in front of the vehicle interior.

A front side in the vehicle front-rear direction corresponds to a front of the vehicle, while a rear side in the vehicle front-rear direction corresponds to a rear of the vehicle. Additionally, in the present embodiment, an outer side in a vehicle width direction indicates an orientation in the vehicle width direction from inside toward outside of a case 10, to be described below.

Figure 3:
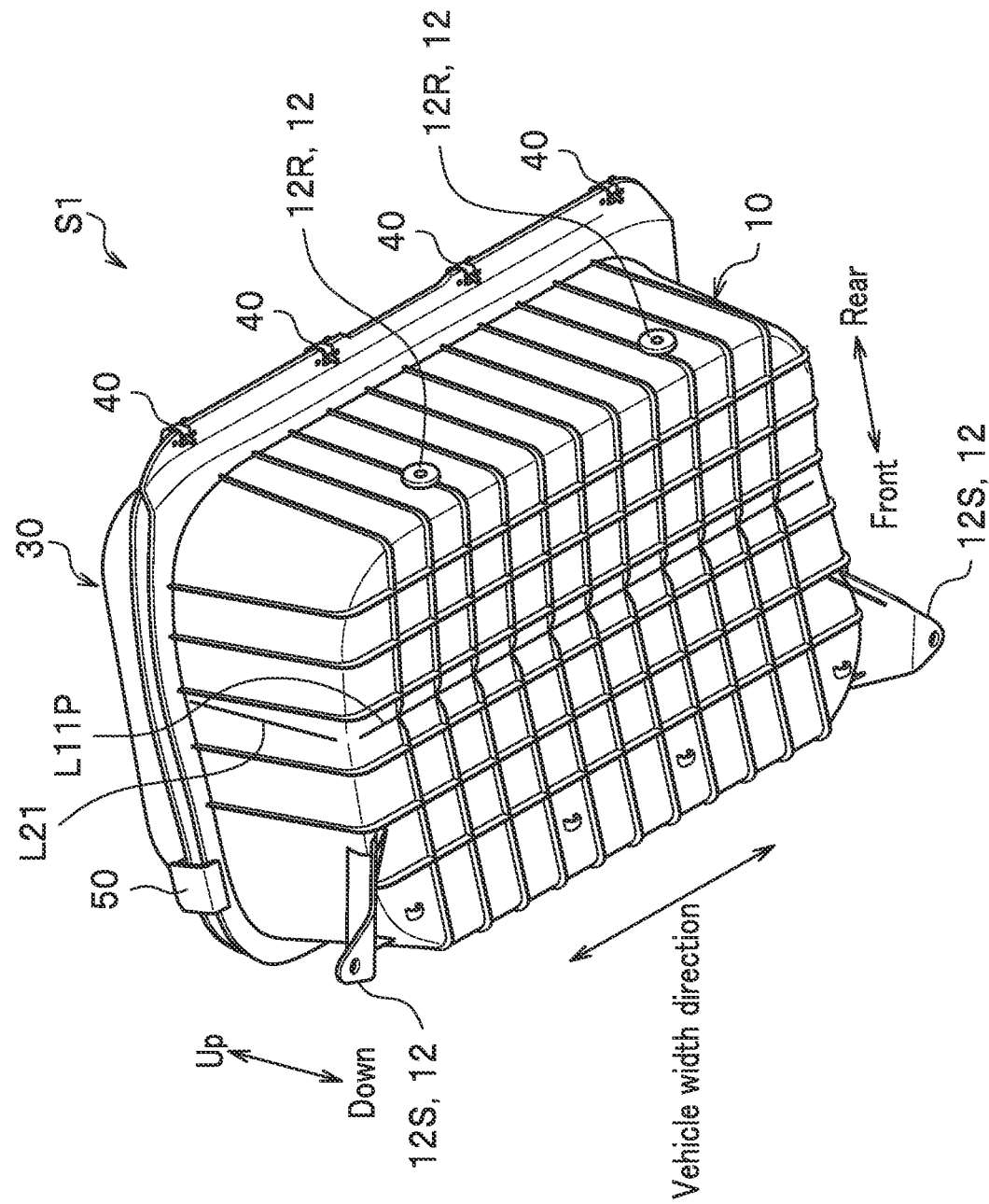
FIG. 3 is a perspective view of the vehicle storage structure according to the first embodiment, as viewed from below.

The vehicle storage structure S1 includes the case 10, a lid 30, an opener 40, and a closure retention member 50, as shown in FIGS. 1 to 3. The case 10 is coupled with the lid 30 by the opener 40 so as to be opened and closed. The closure retention member 50 holds the case 10 in a state closed with the lid 30.

The case 10 includes a bottom plate 11, a side wall 21, and a fixing part 12. The case 10 is a molded product made of resin material by injection molding, and is formed in a box shape having the side walls 21, rising integrally with a periphery of the bottom plate 11, and an open top face. The bottom plate 11 of the case 10 includes a main bottom plate 13 and a bottom rib 14.

The main bottom plate 13 becomes a bottom surface of the case 10 and is in a substantially rectangular shape having a dimension in the vehicle width direction longer than that in the vehicle front-rear direction. Additionally, the main bottom plate 13 has a constant plate thickness (dimension in the up-down direction). The main bottom plate 13 includes a front bottom plate 13F and a rear bottom plate 13R, which are each made of a plate material.

The front bottom plate 13F is installed in the vehicle VC in a front-down state, with a rear edge thereof positioned higher than a front edge thereof. The rear bottom plate is installed in the vehicle VC also in a front-down state but with a gentler slope than the front bottom plate. The front bottom plate 13F and the rear bottom plate 13R are coupled with each other near a center in the vehicle front-rear direction of the case 10.

This forms a bottom ridge line L11P to extend in the vehicle width direction at a boundary between the front bottom plate 13F and the rear bottom plate 13R (a portion where a plate surface of the front bottom plate 13F intersects with a plate surface of the rear bottom plate 13R). Here, the bottom ridge line L11P is positioned above a bottom-end connection line L11 as a straight line connecting a front end of the front bottom plate 13F with a rear end of the rear bottom plate 13R. That is, the main bottom plate is formed in an A-shape bending near the center in the vehicle front-rear direction, along the bottom ridge line L11p extending in the vehicle width direction.

The bottom rib 14 is provided on an outer surface of the main bottom plate 13 in order to enhance rigidity of the bottom surface while avoiding increase in weight of the case 10. The bottom rib 14 includes a longitudinal bottom rib 15 extending in the vehicle front-rear direction and a crosswise bottom rib 16 extending in the vehicle width direction. The longitudinal bottom rib 15 rises vertically downward from the outer surface of the main bottom plate 13 (outer peripheral surface of the case 10) and extends in the vehicle front-rear direction, and there is more than one such rib aligned in the vehicle width direction at predetermined intervals (see FIGS. 6 and 7).

Figure 7:
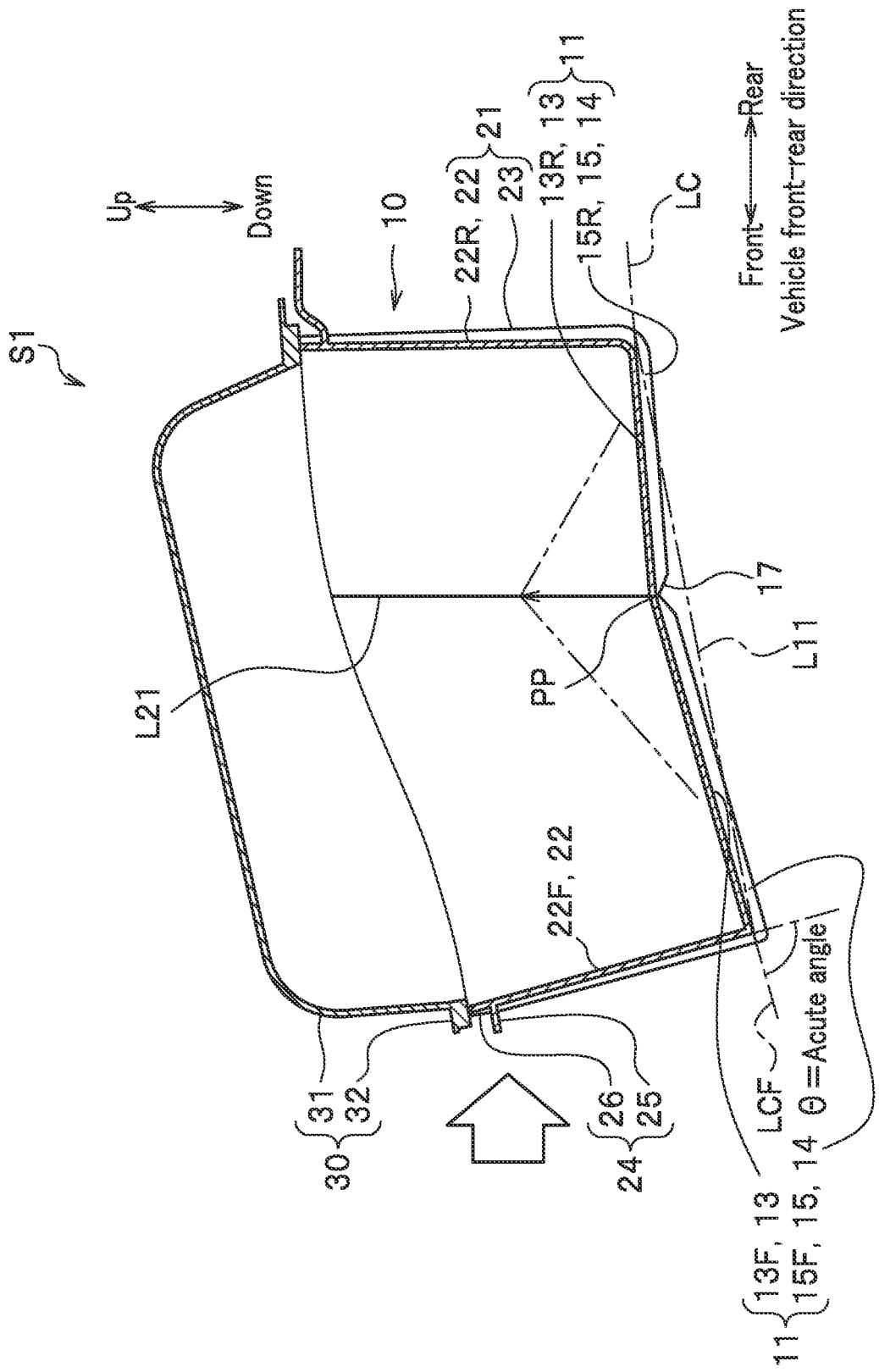
FIG. 7 is a cross-sectional view taken along a line VII-VII in FIG. 4.
Figure 8:
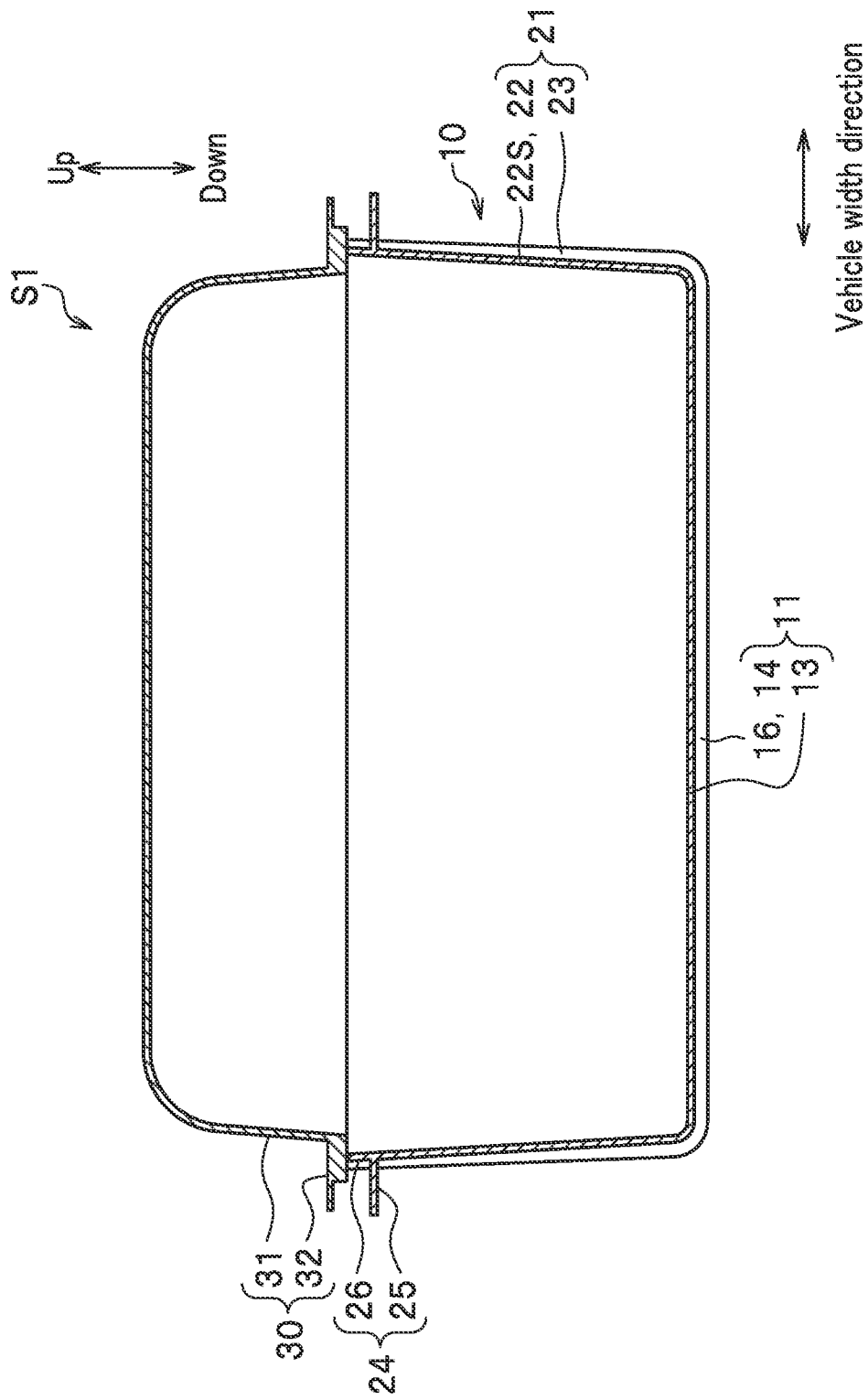
FIG. 8 is a cross-sectional view taken along a line VIII-VIII in FIG. 6.

The crosswise bottom rib 16 rises vertically downward from the outer surface of the main bottom plate 13 (outer peripheral surface of the case 10) and extends in the vehicle width direction, and there is more than one such rib aligned in the vehicle front-rear direction at predetermined intervals (see FIG. 8). That is, the longitudinal bottom ribs 15 and the crosswise bottom ribs 16 are provided on the outer surface of the main bottom plate 13, while bisecting each other at right angles in a grid pattern (see FIG. 5). In addition, the longitudinal bottom ribs 15 and the crosswise bottom ribs 16 are set to have vertical dimensions so as to have a constant height in the vehicle front-rear direction from the outer surface (see FIGS. 6 and 7).

Further, the longitudinal bottom rib 15 is notched at a portion overlapping with the bottom ridge line L11P, to have a notch 17 so as to be partitioned into two in the vehicle front-rear direction. The notch 17 is notched deeper toward the bottom ridge line L11P. This causes the longitudinal bottom plate 15 to have the shortest portion in height at the portion overlapping with the bottom ridge line L11P.

Note that a front portion of the longitudinal bottom rib 15 with respect to the notch 17 is referred to as a front bottom rib 15F (outer bottom rib) and a rear portion of the longitudinal bottom rib 15 with rspect to the notch 17 is referred to as a rear bottom rib 15R (inner bottom rib). In other words, the front bottom rib 15F rises on the outer surface of the front bottom plate 13F, and the rear bottom rib 15R rises on the outer surface of the rear bottom plate 13R.

Here, a center line in the bottom plate 11 is referred to as a bottom-plate center line LC (see FIG. 7). The bottom-plate center line LC is a line in the vehicle front-rear direction, connecting centers in the up-down direction of the bottom plate 11 in combination of the main bottom plate 13 and the bottom ribs 14. In other words, the bottom-plate center line LC is a polygonal line in an A-shape having a ridge PP as a folding point.

The ridge PP is positioned higher than the bottom-end connection line L11 as a straight line connecting a front end of the bottom-plate center line LC with a rear end of the bottom-plate center line LC. The ridge PP continuously extends in the vehicle width direction. In other words, the ridge PP overlaps with the bottom ridge line L11P. Accordingly, the front end of the bottom plate 11, the rear end of the bottom plate 11, and the ridge PP, when connected with straight lines in a lateral view, show a convex-upward triangle.

Next, the side wall 21 is described (see FIGS. 4 to 8). The side wall 21 includes a main side wall 22, a side wall rib 23, a case flange 24, and a fixing part 12. The main side wall 22 rises from the periphery of the bottom plate 11 and is in a substantially polygonal cylinder shape. The main side wall 22 includes a front side wall 22F, a rear side wall 22R, and a pair of lateral side walls 22S.

The front side wall 22F rises from a front edge of the main bottom plate 13 so that an angle $\theta$ between an inner surface of the front side wall 22F and the plate surface of the front bottom plate 13F, in a lateral view, is an acute angle. The rear side wall 22R rises from the bottom plate 11 in a state that a draft angle of a mold (not shown) is set to have a distance from the front side wall 22F spreading with an increasing distance from the bottom plate 11.

The lateral side walls 22S rise from the bottom plate 11 so as to face each other in a state that a draft angle of a mold (not shown) is set to have a distance from each other spreading with an increasing distance from the bottom plate 11. The lateral side walls 22S each include a side-wall ridge line L21 at a portion intersecting the bottom ridge line L11P, extending so as to overlap with a vertical line when installed in the vehicle VC, as viewed in the vehicle width direction (see FIGS. 4 to 7). A straight line connecting a front end of the lateral side wall 22S with a rear end of the lateral side wall 22S is referred to as a side-wall connection line L22S.

Figure 4:
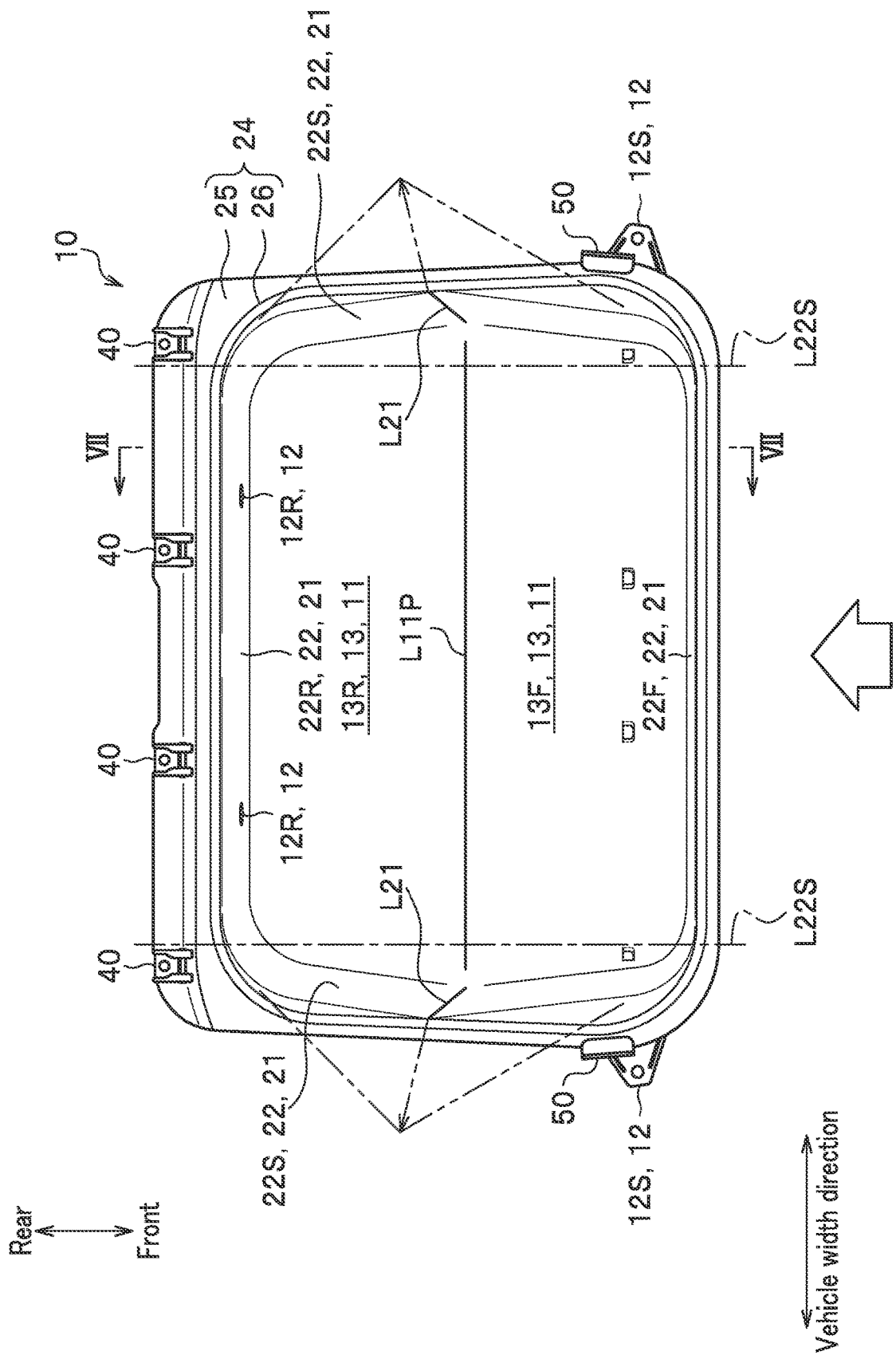
FIG. 4 is a plan view of a case of the vehicle storage structure according to the first embodiment.
Figure 5:
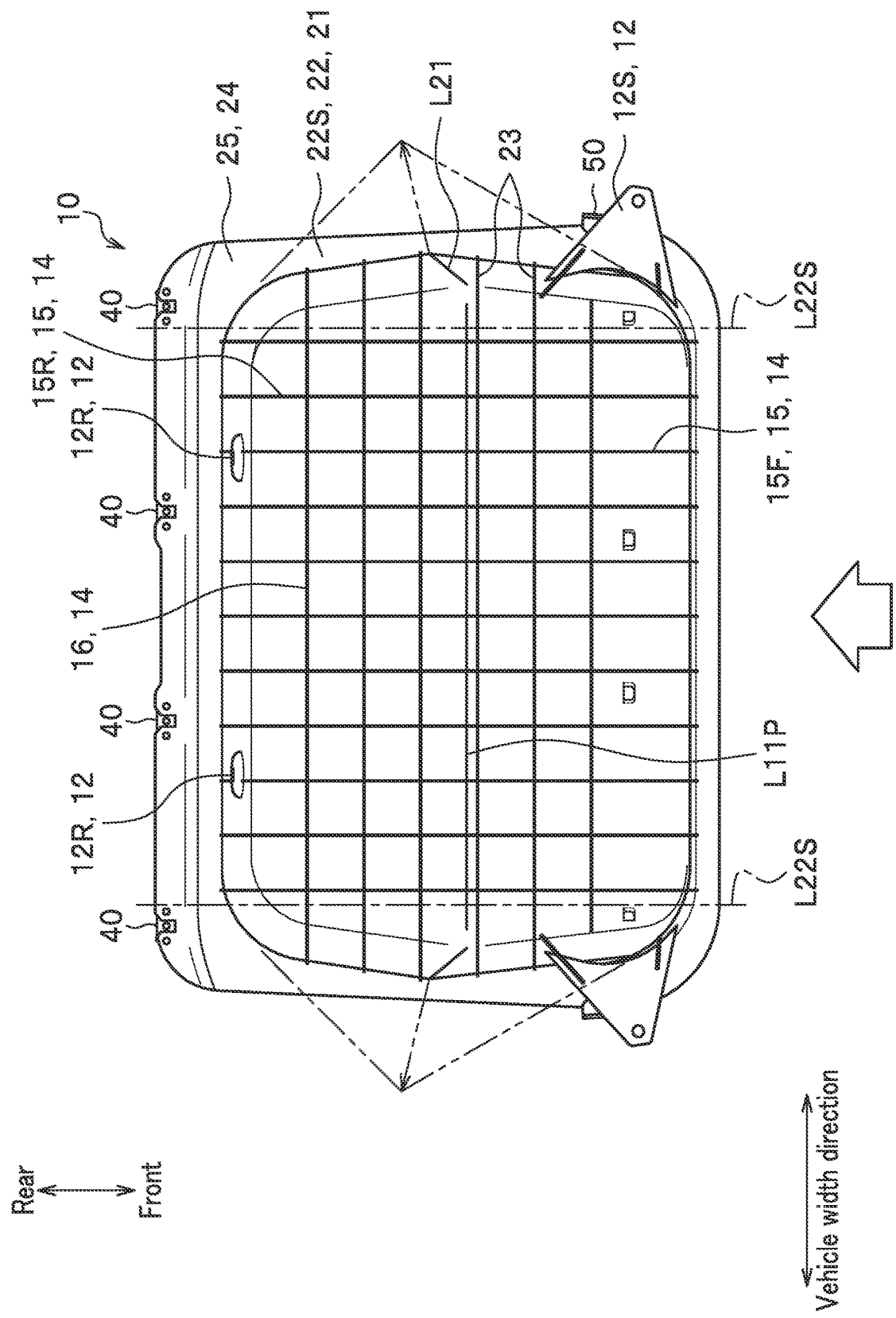
FIG. 5 is a bottom view of the case of the vehicle storage structure according to the first embodiment.

The side-wall ridge line L21 protrudes outward in the vehicle width direction from the case 10 more than the side-wall connection line L22S, to fold the lateral side wall 22S. In other words, the side wall 21 is formed in a polygonal cylinder shape, cross-sectionally in a substantially hexagonal shape, as shown in FIG. 4. The front bottom plate 13F and the rear bottom plate 13R are each formed in an isosceles trapezoid shape, to have a substantially hexagonal shape as the bottom plate 11 in a plan view.

Note that a direction of removing a mold is set to a direction along a line within an angle between the front side wall 22F and the rear side wall 22R and a line within an angle between the lateral side walls 22S. The mold is moved in the direction of removing the mold.

Next, the side wall rib 23 is described. The side wall rib 23 is provided to enhance rigidity of the main side wall 22 while avoiding increase in weight of the case 10, as with the bottom rib 14. The side wall rib 23 rises vertically from the outer surface of the main side wall 22 outward of the case, integrally with the front-rear bottom rib 15 and the lateral bottom ribs 16 as a continuation of the front-rear bottom rib 15 and the lateral bottom rib 16. An extending direction of the side wall rib 23 is set to match the direction of removing the mold when the case 10 is formed by injection molding.

In other words, there is more than one such rib and the side wall ribs 23 are aligned in a circumferential direction of the polygonal cylinder at predetermined intervals. Note that the side wall rib 23 of the lateral side wall 22S extends in the direction of removing the mold, while the side-wall ridge line L21 extends so as to overlap with a vertical line (see FIG. 6). Then, the side wall rib 23 of the lateral side wall 22S is provided around a portion of the lateral side wall 22S overlapping with the side-wall ridge line L21.

Next, the case flange 24 is described (see FIGS. 2 to 8). The case flange 24 is provided at a rim of an opening of the side wall 21 (rim of an opening of the case 10) in order to secure sufficient rigidity at the opening of the case 10. The case flange 24 includes a frame portion 25 and a protruding portion 26.

The frame portion 25 overhangs the rim of the opening of the main side wall 22 from an inner surface toward an outer surface, and has a shape of a rectangular frame in a plan view. The frame portion 25 is curved in the up-down direction to follow an A-shape of the bottom plate 11 in a lateral view. The protruding portion 26 rises upward from the frame portion 25, while overlapping with the rim of the opening of the side wall 21. In a state that the lid 30 has closed the case 10, the protruding portion 26 closely contacts a lid flange 32, to be described below, to tightly close the vehicle storage structure S1.

Next, the fixing part 12 is described (see FIGS. 2 to 6). The fixing part 12 is provided as a component to fix the case 10 to the vehicle VC. The fixing part 12 includes a side fixing part 12S and a rear fixing part 12R. The side fixing part 12S is composed of a pair of triangular pieces to protrude outward in the vehicle width direction from front lower portions of the lateral side walls 22S so as to be tapered. The side fixing part 12S is fixed to the vehicle VC, with bolts (not shown) penetrating front ends of the triangular pieces in the vehicle up-down direction.

The rear fixing part 12R is composed of a pair of washers provided on a lower portion of the rear side wall 22R. The rear fixing part 12R has circular recesses in an inner surface of the rear side wall 22R to contain heads of bolts (not shown). The rear fixing part 12R is fixed to the vehicle VC, with the bolts (not shown) penetrating the circular washers in the vehicle front-rear direction. That is, the vehicle storage structure S1 of the present embodiment is fixed to the vehicle VC at two spots on the side surfaces and two spots on the rear surface, or four spots in total.

Figure 6:
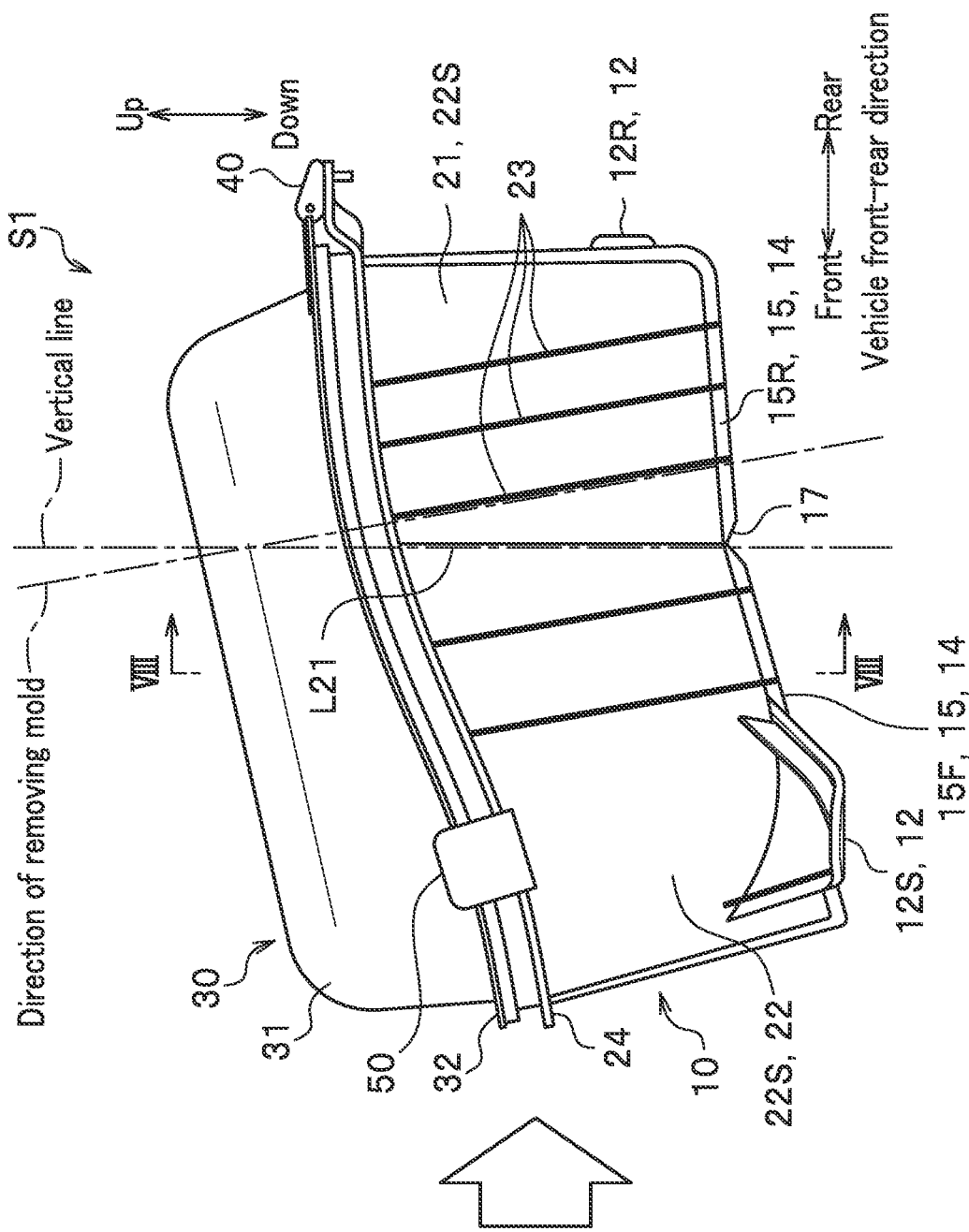
FIG. 6 is a lateral view of the vehicle storage structure according to the first embodiment.

Next, the lid 30 is described (see FIGS. 6 and 7). The lid 30 includes a main lid 31 and the lid flange 32. The main lid 31 is formed to have a box shape with an open bottom surface. The lid flange 32 overhangs a rim of an opening of the main lid 31 from an inner surface toward an outer surface, and has a shape of a rectangular frame in a plan view. In a state that the lid 30 has closed the case 10, the lid flange 32 contacts the protruding portion 26, while overlapping the case flange 24.

Next, the opener 40 is described (see FIGS. 2 to 6). The opener 40 is provided as a component on which the lid 30 swings as it opens and closes with respect to the case 10, and a hinge is employed as the opener 40. The opener 40 has one part of the hinge arranged at a rear rim of the frame portion 25 and the other part of the hinge arranged at a rear rim of the lid flange 32, to be described below. There is more than one such opener and the four openers 40 are provided in the vehicle width direction at equal intervals.

Next, the closure retention member 50 is described (see FIGS. 2 to 6). The closure retention member 50 is provided as a component to hold a state that the lid 30 has closed the case 10, and a clamp in a U-shape is employed as the closure retention member 50.

The closure retention member 50 is provided at a portion of the case flange 24, which is positioned at a front portion of each of the lateral side walls 22S. The closure retention member 50 is supported by a bottom surface of the frame portion 25 in a plan view so as to be swingable between an open position and a closed position. The closure retention member 50 in the closed position clamps the lid flange 32 and the case flange 24 inside a U-shape thereof.

This causes the lid 30 to be restricted from moving toward a direction of opening the case 10, to retain the case 10 closed by the lid 30. In contrast, the closure retention member 50 in the open position unlocks the lid flange 32 and the case flange 24. This causes the lid 30 to be released from a restriction of moving toward a direction of opening the case 10, to allow the lid 30 to be opened and closed.

Next, a description is given of a situation where an excessive load is inputted to the vehicle storage structure from ahead of the vehicle toward a rear of the vehicle. If the vehicle VC collides with an obstacle in front thereof, for example, equipment V1 arranged at a front of the motor room MR, such as a heat exchanger of an air conditioner, is pushed and moved rearward, along with an exterior part V2 (see FIG. 1). Then, the front side wall 22F is pushed rearward by the equipment V1 and the exterior parts V2.

In addition, a side frame V3 of the vehicle VC is crushed in order from front to rear by the exterior part V2 moving rearward, and the side fixing parts 12S fixed to the side frame V3 are moved rearward. Further, the front side wall 22F is moved rearward to make the front side wall 22F closer to the rear side wall 22R so that the side-wall ridge line L21 is moved outward in the vehicle width direction, to fold the lateral side wall 22S along the side-wall ridge line L21 (see FIGS. 4 and 7).

Then, the bottom ridge line L11P (ridge PP) is moved upward to fold the main bottom plate 13 in an A-shape along the bottom ridge line L11P (ridge PP), to crush the case 10. Additionally, if the front side wall 22F is made more closer to the rear side wall 22R, the closure retention member 50 is unlocked to open the lid 30.

Next, a description is given of advantageous effects of the vehicle storage structure S1 according to the present embodiment. In the present embodiment, the bottom-plate center line LC has the ridge PP located midway therein, which is positioned higher than the bottom-end connection line L11, as shown in FIG. 7. That is, the bottom-plate center line LC is folded in an A-shape along the ridge PP. The main bottom plate 13 is folded in an A-shape along the bottom ridge line L11P, which overlaps with the ridge PP and extends in the vehicle width direction.

Having the bottom plate 11 as described above allows the ridge PP of the bottom plate 11 to be moved upward, if an excessive load is inputted from ahead rearward, to crush the case 10. In other words, when the case 10 is crushed, the ridge PP is moved inside of the case 10, instead of outside. This allows for crushing the vehicle storage structure S1, without impairing a performance of the shock absorbing structure (not shown)

In the present embodiment, the lateral side wall 22S has the side-wall ridge line L21 and the side wall 21 is formed in a polygonal cylinder shape, cross-sectionally in a substantially hexagonal shape, as shown in FIG. 4. In other words, the side-wall ridge line L21 protrudes outward in the vehicle width direction from the case 10 more than the side-wall connection line L22, which connects the front end of the lateral side wall 22S with the rear end of the lateral side wall 22S, to fold the lateral side wall 22S.

This ensures that the lateral side wall 22S is moved outward from the case 10, when an excessive load is inputted to the vehicle VC rearward from ahead of the vehicle, and is folded along the side-wall ridge line L21. In other words, the lateral side wall 22S is ensured to be folded outside the bottom plate 11. Additionally, the deformation of the lateral side wall 22S being folded outside the bottom plate 11 allows for pushing out items, which may stand in the way when the bottom plate 11 is folded in an A-shape, out of the case 10, to further ensure that the bottom plate 11 is folded in an A-shape.

In the present embodiment, the front side wall 22F rises from the front edge of the main bottom plate 13 so that an angle θ between the inner surface of the front side wall 22F and a front-bottom-plate center line LCF is an acute angle, as shown in FIG. 7. In other words, the angle θ between the bottom-plate center line LC of the front bottom plate 13F (a portion of the bottom plate 11 on the front side of the ridge PP) and the front side wall 22F is an acute angle. This prevents the bottom plate 11 from being bent downward to protrude, when an excessive load is inputted to the vehicle VC rearward from ahead of the vehicle, to still further ensure that the bottom plate 11 is folded in an A-shape.

In the present embodiment, the longitudinal bottom rib 15 is notched at a portion overlapping with the ridge PP (the bottom ridge line L11P), so as to be partitioned into the front bottom rib 15F and the rear bottom rib 15R, as shown in FIG. 7. This allows for concentrating a load inputted to the bottom plate 11 from outside on the ridge PP (the bottom ridge line L11P), to still further ensure that the bottom plate 11 is folded in an A-shape.

In the present embodiment, the side-wall ridge line L21 extends so as to overlap with a vertical line, as viewed in the vehicle width direction, as shown in FIG. 6. It is assumed that an excessive load from outside might be inputted horizontally in many cases, such as when the vehicle itself collides with something around it and when another vehicle collides with the vehicle itself.

The side-wall ridge line L21 extends in a direction intersecting the direction of such a load being inputted, to prevent the load inputted to the side wall 21 from outside from being deconcentrated so that the inputted load is more concentrated to the side-wall ridge line L21. This further ensures that the lateral side wall 22S is folded along the side-wall ridge line L21.

In the present embodiment, the side wall rib 23 is provided around the portion of the lateral side wall 22S overlapping with the side-wall ridge line L21, as shown in FIG. 6. This allows for more concentrating a load inputted to the side wall 21 from outside on the side-wall ridge line L21, to still further ensure that the side wall 21 is folded along the side-wall ridge line L21.

Note that the case 10 is made separately from the lid 30 and is opened and closed by the lid 30, using the opener 40 as a separate part, in the present embodiment, but the present invention is not limited thereto. For example, the case 10 and the lid 30 may be integrally formed of resin material having flexibility of being bent, to have a hinge structure, so as to be opened and closed, instead of using the opener 40.

The vehicle storage structure S1 of the present embodiment is arranged in the motor room MR, which is in front of the vehicle interior and outside the vehicle interior, but the position is not limited thereto. For example, the structure may be arranged in a rear of a vehicle such as a station wagon, as an underfloor storage under a luggage space (within a vehicle interior).

In such a case, the case 10 may be arranged under a floor surface (not shown) and the floor surface may be used as the lid 30 but not fixed to the case 10, to have the similar advantageous effects to the present embodiment. When the vehicle storage structure S1 is arranged in the rear of the vehicle, the vehicle exterior is located on a rear side and the vehicle interior is located on a front side.

Second Embodiment

Figure 9:
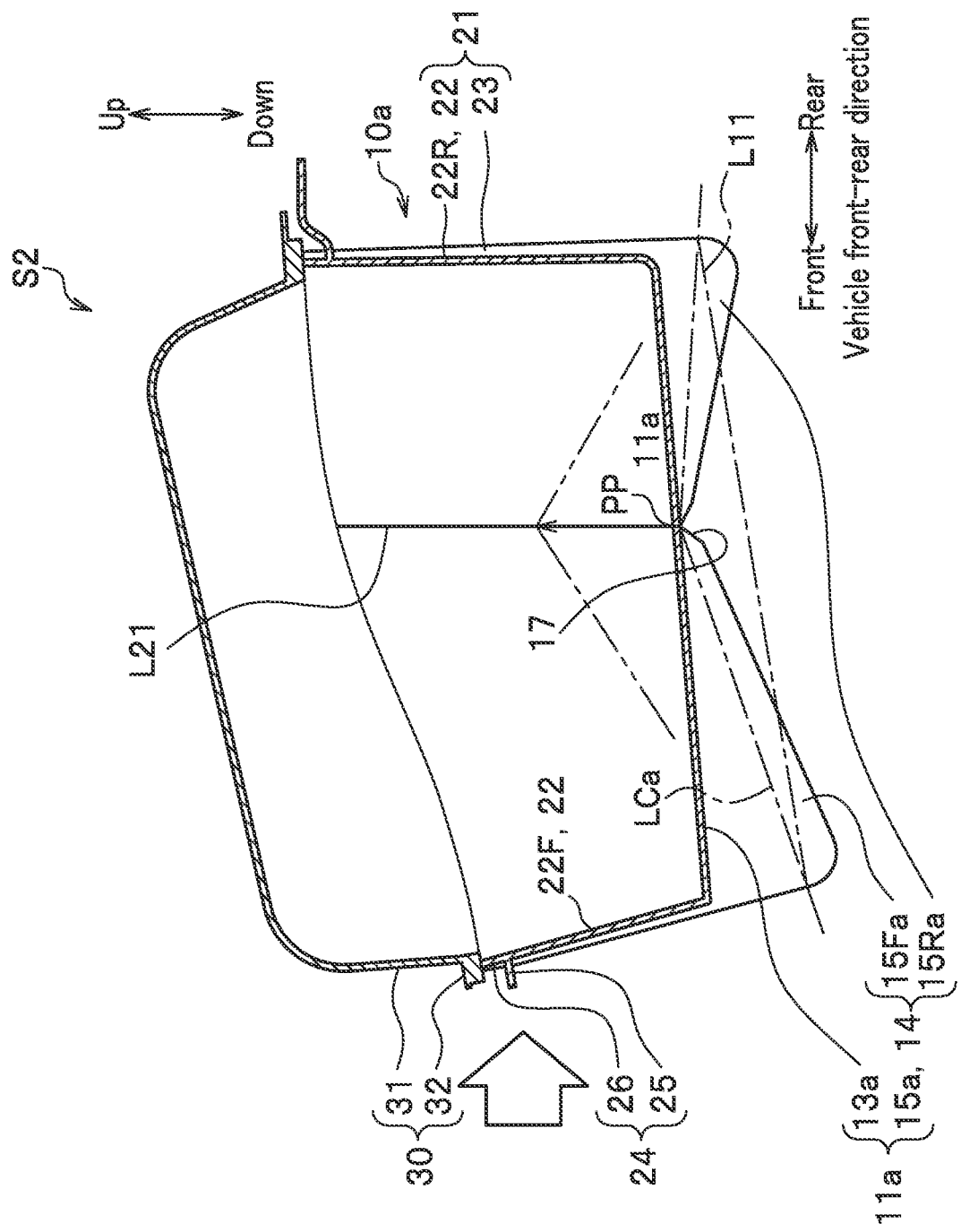
FIG. 9 is a cross-sectional view of a case of a vehicle storage structure according to a second embodiment, corresponding to that taken along the line VII-VII in FIG. 4.

Next, a second embodiment of the present invention is described in detail, with reference to FIG. 9. Note that the same components as those of the first embodiment are denoted by the same reference numerals, and duplicate descriptions thereof are omitted. A vehicle storage structure S2 of the second embodiment notably differs from the vehicle storage structure S1 of the first embodiment as described above on the point that a bottom plate 11a of the case 10 is configured differently, more specifically a main bottom plate 13a and a longitudinal bottom rib 15a are configured differently.

The main bottom plate 13a is made of a flat plate material which is not bent and is even. In other words, a case 10a of the second embodiment has a bottom surface which has no ridge lines and is even. The longitudinal bottom rib 15a is partitioned by the notch 17 into two, a front bottom rib 15Fa (outer bottom rib) and a rear bottom rib 15Ra (inner bottom rib), as with the first embodiment, but the front bottom rib 15Fa and the rear bottom rib 15Ra are configured differently.

The front bottom rib 15Fa (outer bottom rib) is made to have a height from an outer surface of the main bottom plate 13a (peripheral surface of the case 10) being gradually decreased toward the notch 17, rearward from a front side. The rear bottom rib 15Ra (inner bottom rib) is made to have a height from an outer surface of the main bottom plate 13a (peripheral surface of the case 10) being gradually decreased toward the notch 17, frontward from a rear side.

Such a configuration of the bottom plate 11a makes a bottom-plate center line LCa formed as a polygonal line, in a lateral view, bent in an A-shape along the ridge PP which overlaps with the notch 17. Note that the ridge PP is positioned higher than the bottom-end connection line L11, connecting the front end of the bottom-plate center line LCa with the rear end of the bottom-plate center line LCa, as with the first embodiment.

Next, a description is given of advantageous effects of the vehicle storage structure S2 of the second embodiment. The configuration of the front bottom rib 15Fa and the rear bottom rib 15Ra allows the case 10 to have an inner bottom surface as a flat surface without any ridge lines, while presenting the same advantageous effects as the first embodiment. This prevents items (not shown) stored in the vehicle storage structure S2 from jouncing while the vehicle is traveling.

Note that the front bottom rib 15Fa and the rear bottom rib 15Ra of the present embodiment are each formed to have the height decreased toward the notch 17, but are not limited thereto. For example, only one of the front bottom rib 15Fa and the rear bottom rib 15Ra may be formed to have the height decreased toward the notch 17, while making the other thereof have a constant height, as with the first embodiment. Such a configuration allows for defining the bottom-plate center line LCa in a polygonal line, in a lateral view, based on uneven heights of pieces of equipment (not shown) located under the case 10.

Third Embodiment

Figure 10:
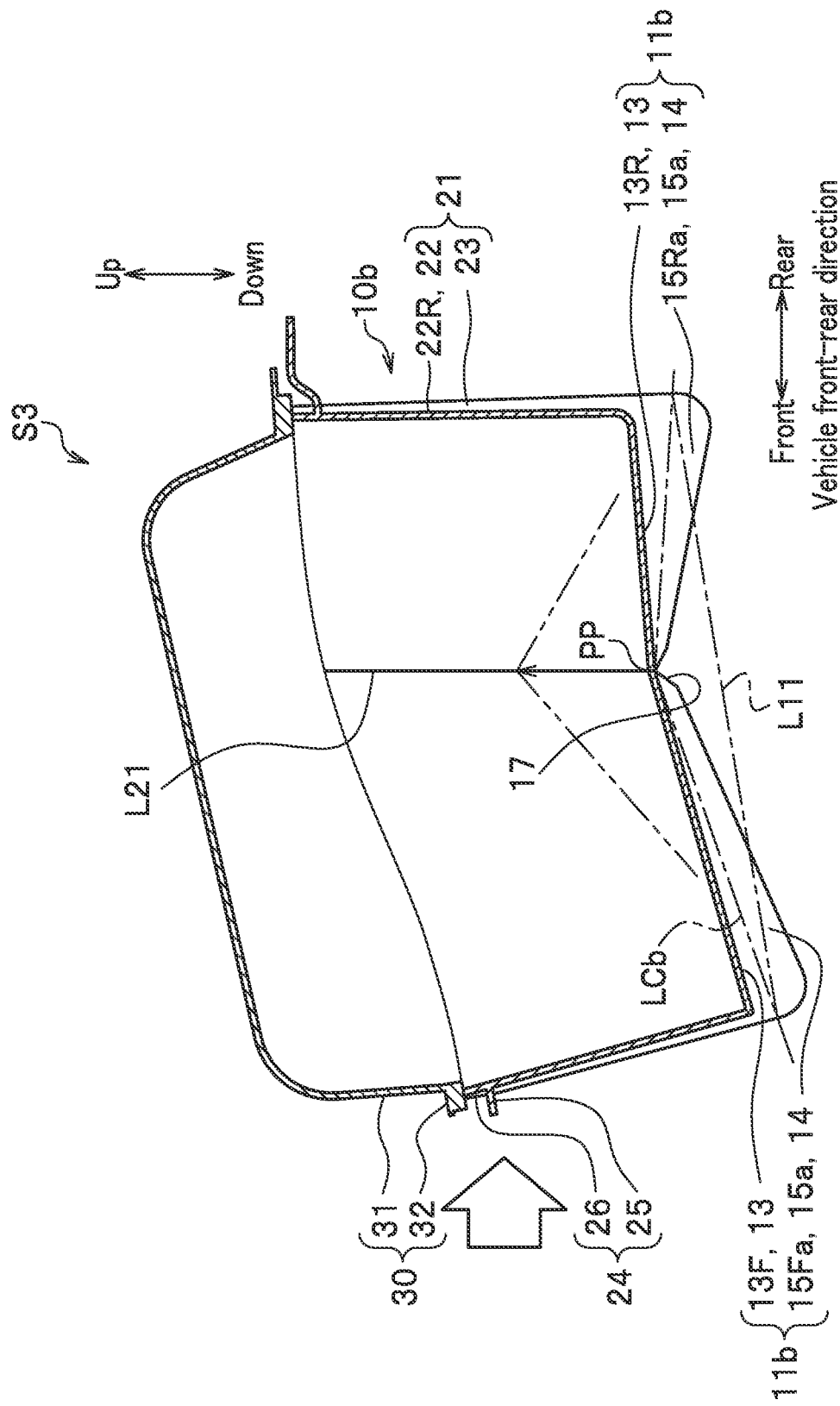
FIG. 10 is a bottom view of a case of a vehicle storage structure according to a third embodiment.

Next, a third embodiment of the present invention is described in detail, with reference to FIG. 10. Note that the same components as those of the first embodiment are denoted by the same reference numerals, and duplicate descriptions thereof are omitted. A vehicle storage structure S3 of the third embodiment notably differs from the vehicle storage structure S1 of the first embodiment as described above on the point that a bottom plate 11b of the case 10 is configured differently. The bottom plate 11b of the present embodiment is formed in an A-shape, as with the first embodiment.

Additionally, the longitudinal bottom rib 15a is formed to have a height gradually decreased toward the notch 17, as with the second embodiment. That is, the present embodiment is configured to have a combination of the features of the first and second embodiments. Such a configuration allows for making a bottom-plate center line LCb bent more sharply. This allows for folding the bottom plate 11 in an A-shape more securely, when an excessive load is inputted.

Fourth Embodiment

Figure 11:
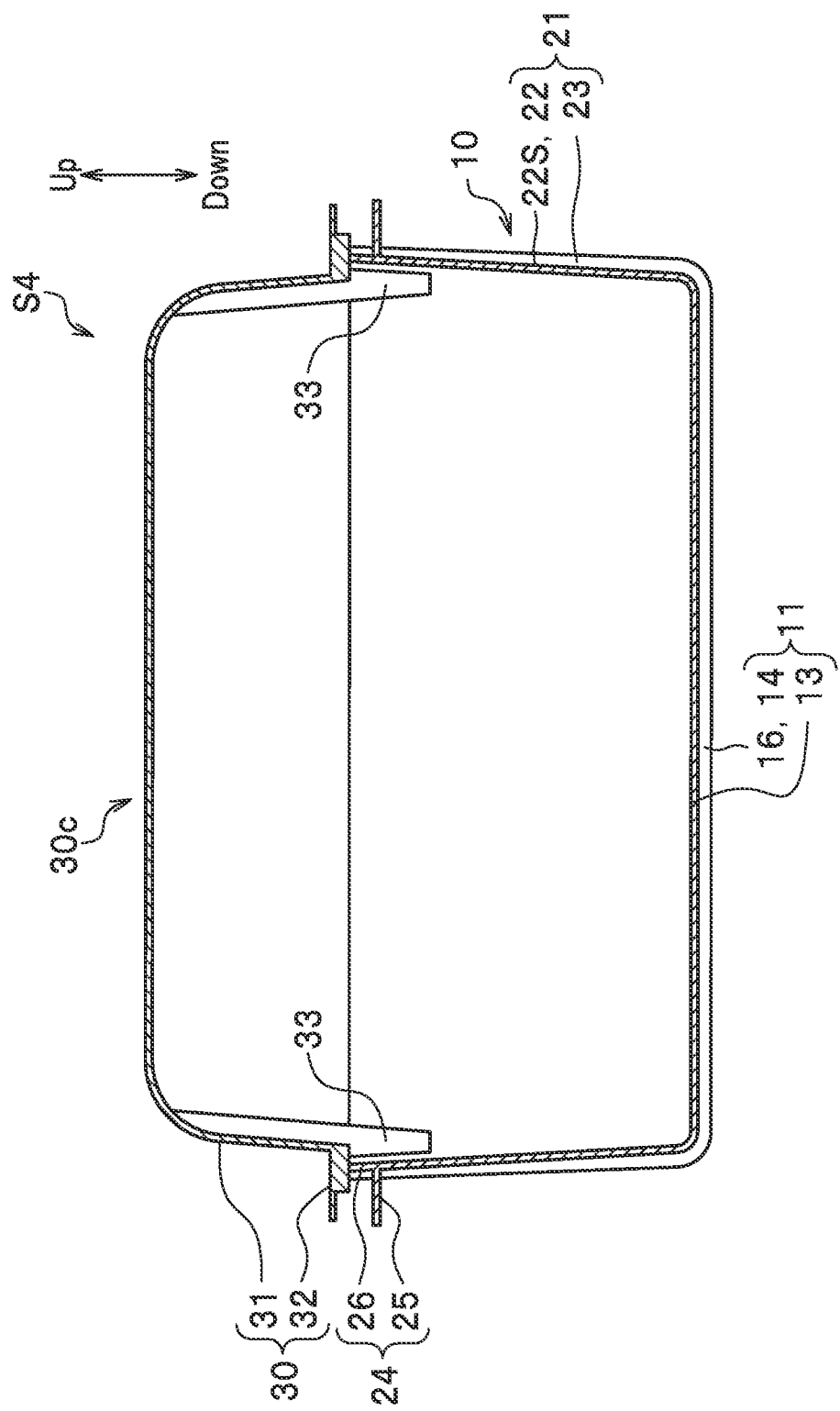
FIG. 11 is a cross-sectional view of a vehicle storage structure according to a fourth embodiment, corresponding to that taken along the line VII-VII in FIG. 4.

Next, a fourth embodiment of the present invention is described in detail, with reference to FIG. 11. Note that the same components as those of the first embodiment are denoted by the same reference numerals, and duplicate descriptions thereof are omitted. A vehicle storage structure S4 of the fourth embodiment notably differs from the vehicle storage structure S1 of the first embodiment as described above on the point that a lid 30c includes a wall support shaft 33.

The wall support shaft 33 is provided on an inner surface of the lid 30c, integrally formed with the lid 30c and protruding from an opening of the lid 30c. The wall support shaft 33 contacts an inner surface of the case 10 along the side-wall ridge line L21, in a state that the lid 30c has closed the case 10.

If the lateral side wall 22S is about to turn over inside the case 10, the wall support shaft 33 supports the lateral side wall 22S, to prevent the lateral side wall 22S from turning over. Such a function prevents the lateral side wall 22S from turning over inside the case 10 to inhibit the bottom plate from being folded in an A-shape.

That is, the lid 30c includes the wall support shaft 33 and this allows the bottom plate 11 to be more securely folded in an A-shape.

Fifth Embodiment

Figure 12:
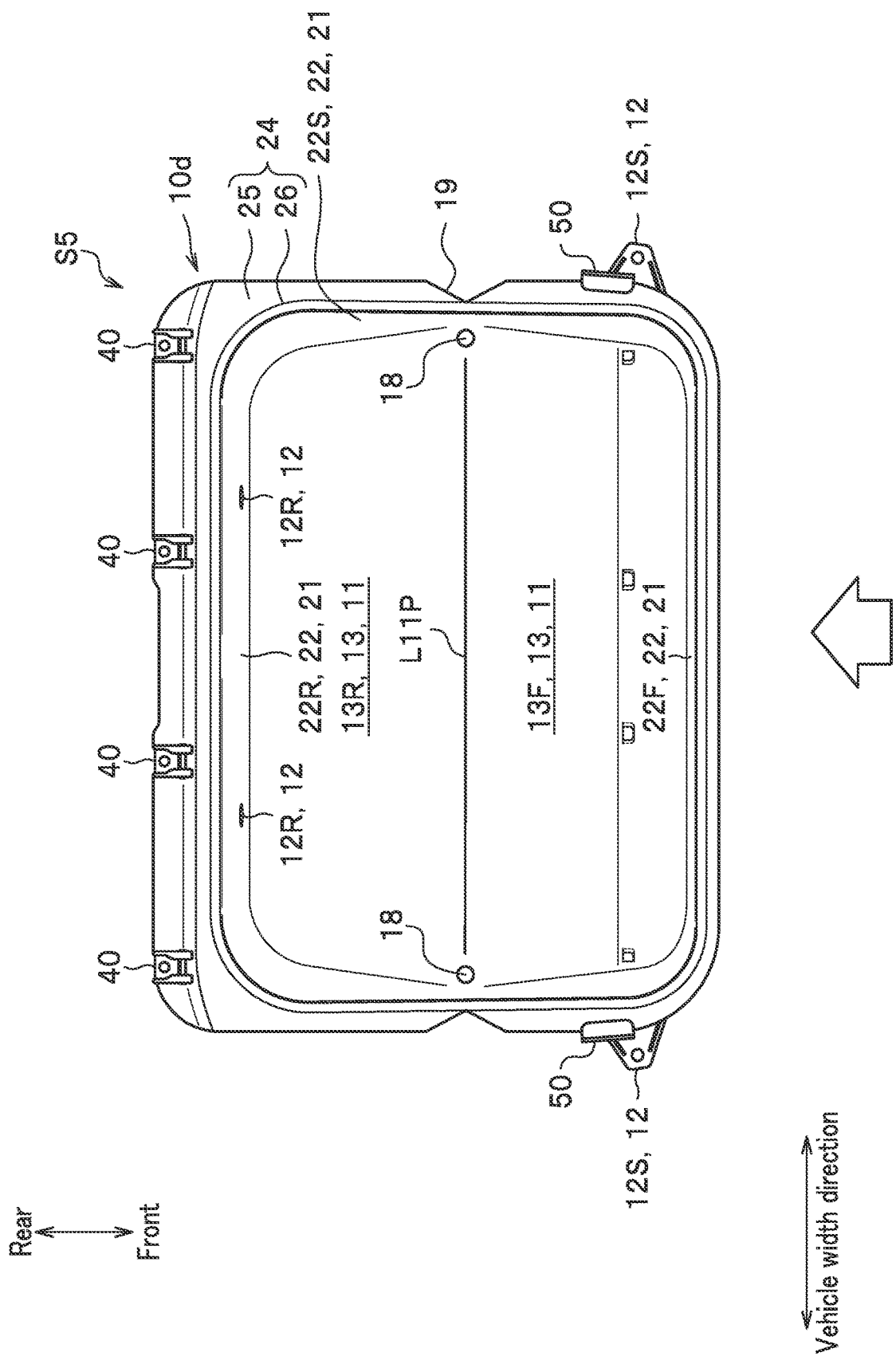
FIG. 12 is a plan view of a case of a vehicle storage structure according to a fifth embodiment.
Figure 13:
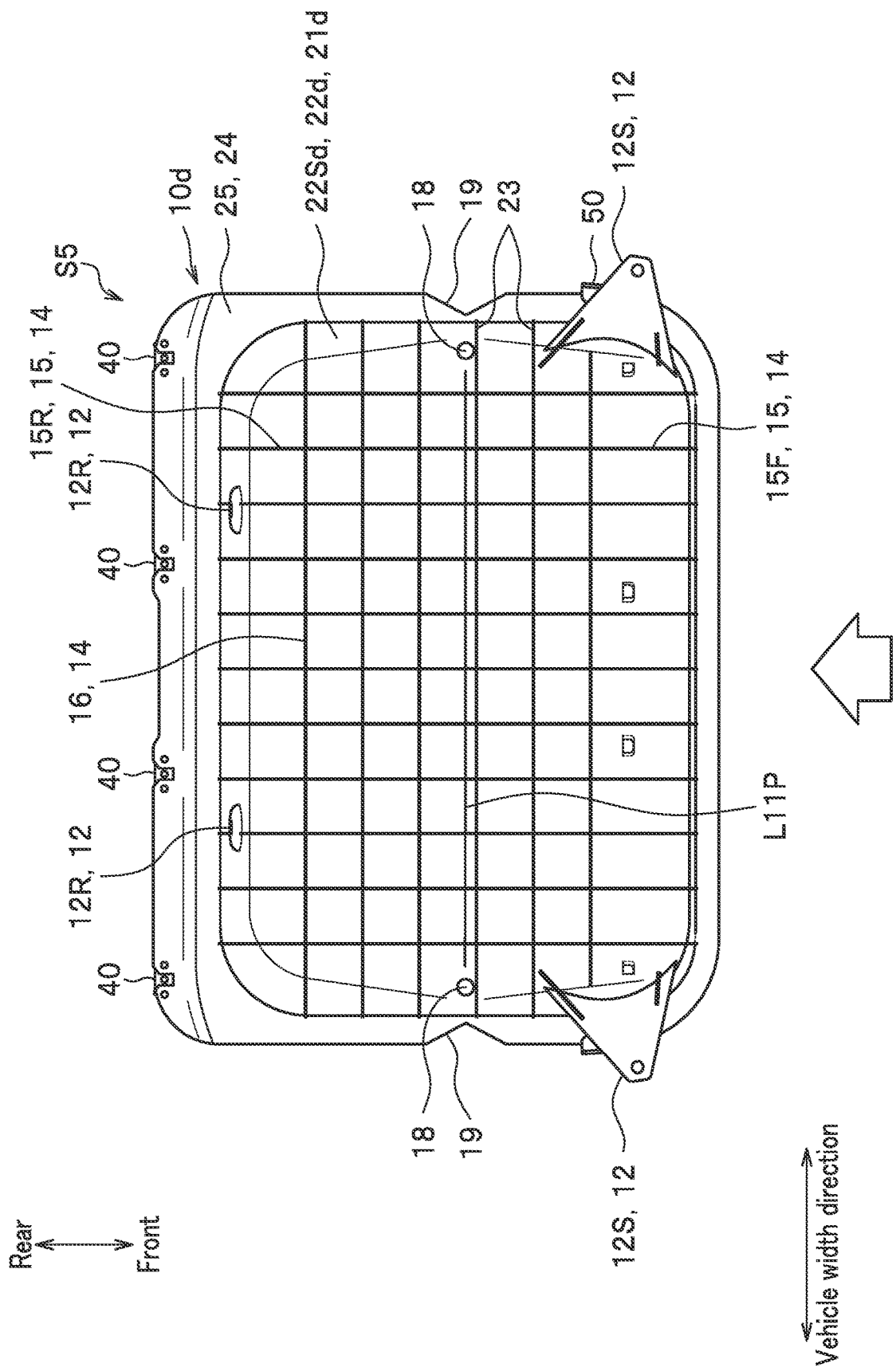
FIG. 13 is a bottom view of the case of the vehicle storage structure according to the first embodiment.

Next, a fifth embodiment is described in detail with reference to FIGS. 12 and 13. Note that the same components as those of the first embodiment are denoted by the same reference numerals, and duplicate descriptions thereof are omitted. A vehicle storage structure S5 of the fifth embodiment notably differs from the vehicle storage structure S1 of the first embodiment as described above on the point that a case 10d is configured differently. A side wall 21d of the case 10d is formed in a polygonal cylinder shape having a substantially rectangular cross section.

In other words, a lateral side wall 22Sd of the present embodiment has no side-wall ridge lines provided. In addition, a ridge weak point 18 is provided at an intersection between the bottom ridge line L11P of the main bottom plate 13 and the lateral side wall 22Sd, where the plate and the wall are included in the case 10d. The ridge weak point 18 is made of a through-hole vertically penetrating the main bottom plate 13. Further, a part of the frame portion 25, located vertically above the ridge weak point 18, is notched to have a notch 19.

Providing the ridge weak point 18 makes a mechanical strength of a portion of the case 10d, at which three surfaces of the front bottom plate 13F, the rear bottom plate 13R, and the lateral side wall 22Sd intersects with each other, reduced. Additionally, providing the notch 19 allows the lateral side wall 22Sd to be easily spread outward in the vehicle width direction. These features lower inhibition against the ridge PP being moved upward if an excessive load is inputted, to allow the bottom plate 11 to be more securely folded.

LIST OF REFERENCE SIGNS

S1: vehicle storage structure, 10: case, 11: bottom plate, 13: main bottom plate, 15: front-rear bottom rib, 15F: front bottom rib, 15R: rear bottom rib, 21: side wall, 22F: front side wall, 23: side wall rib, PP: ridge, LC: bottom-plate center line, L11: bottom-end connection line, L11P: bottom ridge line, L21: side-wall ridge line, and L22S: side-wall connection line.

What is claimed is:

1. A vehicle storage structure comprising:
a case formed in a box shape having side walls, rising integrally with a periphery of a bottom plate, and an open top face, wherein
when a line in a vehicle front-rear direction, connecting centers in an up-down direction of the bottom plate, is defined as a bottom-plate center line, and a line connecting a front end of the bottom-plate center line with a rear end of the bottom-plate center line is defined as a bottom-end connection line,
the bottom-plate center line is a polygonal line having a ridge as a folding point, and
the ridge is positioned higher than the bottom-end connection line.

2. The vehicle storage structure as claimed in claim 1, comprising:
a main bottom plate to form a bottom surface of the case, wherein the main bottom plate is folded in an A-shape along a bottom ridge line, which extends in a vehicle width direction while overlapping with the ridge.

3. The vehicle storage structure as claimed in claim 2, wherein
the side walls are each provided, at a portion intersecting the bottom ridge line, with a side-wall ridge line extending in the up-down direction,
wherein the side-wall ridge line protrudes outward in the vehicle width direction from the case more than a side-wall connection line connecting a front end of each of the side walls with a rear end of each of the side walls, to fold each of the side walls.

4. The vehicle storage structure as claimed in claim 3, wherein the side-wall ridge line extends so as to overlap with a vertical line.

5. The vehicle storage structure as claimed in claim 3,
wherein the side walls are each provided, on an outer peripheral surface of the case, with side wall ribs rising outward of the case and extending in the up-down direction so as to be aligned in a vehicle front-rear direction at predetermined intervals,
wherein the side wall ribs are provided around a portion of the side wall overlapping with the side-wall ridge line.

6. The vehicle storage structure as claimed in claim 1,
wherein an angle between the bottom-plate center line of a portion of the bottom plate on a front side of the ridge and a front side wall of the side walls intersecting the bottom plate is an acute angle.

7. The vehicle storage structure as claimed in claim 1,
wherein the bottom plate is provided, on an outer peripheral surface of the case, with longitudinal bottom ribs rising downward and extending in the vehicle front-rear direction so as to be aligned in a vehicle width direction at predetermined intervals,
wherein the longitudinal bottom ribs are each partitioned into an outer bottom rib and an inner bottom rib at a portion thereof overlapping with the ridge.

8. The vehicle storage structure as claimed in claim 7,
wherein at least one of the outer bottom rib and the inner bottom rib is formed to have a height from the main bottom plate decreased in the vehicle front-rear direction toward the ridge.

* * * * *